United States Patent

Van Westering

[15] 3,647,297

[45] Mar. 7, 1972

[54] SWITCHING DEVICE FOR FEEDING THE LIGHT SOURCE OF A PHOTOGRAPHIC ENLARGER

[72] Inventor: Peter Jan Van Westering, Emmasingel, Eindhoven, Netherlands

[73] Assignee: U.S. Philips Corporation, New York, N.Y.

[22] Filed: Aug. 7, 1969

[21] Appl. No.: 848,176

[30] Foreign Application Priority Data

Aug. 14, 1968 Netherlands..........................6811524

[52] U.S. Cl...................................................355/68, 355/69
[51] Int. Cl.........................................................G03b 27/78
[58] Field of Search.............................................355/68, 69

[56] References Cited

UNITED STATES PATENTS 2,149,250 3/1939 Bing....................................355/68 X
2,201,606 5/1940 Bing........................................355/68
2,605,447 7/1952 Troup.................................355/68 X
3,086,709 4/1963 Simmon..............................355/69 X

*Primary Examiner*—Samuel S. Matthews
*Assistant Examiner*—Monroe H. Hayes
*Attorney*—Frank R. Trifari

[57] ABSTRACT

An automatic exposure control system that includes a photosensitive element in one arm of a bridge circuit and a first potentiometer connected in a second bridge arm via a first switch. A capacitor is connected to the supply source via a second potentiometer and a second switch. In the second operating position of the two switches, the capacitor forms a closed circuit with the first potentiometer and a relay coil. A contact of the relay controls the supply of electric energy to a light source for a photographic enlarger. A third switch coupled to the first switch is connected in shunt with the relay contact.

11 Claims, 3 Drawing Figures

INVENTOR.
PETER J. VAN WESTERING
BY
AGENT

INVENTOR.
PETER J. VAN WESTERING
BY
[signature]
AGENT

SWITCHING DEVICE FOR FEEDING THE LIGHT SOURCE OF A PHOTOGRAPHIC ENLARGER

This invention relates to a switching device for feeding, at least in part, an exposure light-source of a photographic enlarger, the device having a photosensitive element included in a measuring circuit and the exposure time being adjustable.

Known switching devices of the kind mentioned in the preamble have the disadvantage of not taking into account all factors for obtaining a print of satisfactory quality.

An object of the invention is to provide a switching device which is of simple design and in which all essential factors, such as exposure time, paper gradation, etc., are taken into account.

A switching device according to the invention for feeding, at least in part automatically, an exposure light source of a photographic magnifying apparatus, the device having a photosensitive element included in a measuring circuit and the exposure time being adjustable, is characterized in that the switching device has two variable electrical circuit elements one of which is connected to a first changeover switch in such manner that at one position (A) thereof this first circuit element forms part of the measuring circuit. A capacitor is provided which may be connected through a second changeover switch to a supply source and whereby this capacitor is connected to the second variable circuit element at one position (A) of the second changeover switch. The capacitor forms a closed circuit with the first variable circuit element at the other positions (B) of the two changeover switches, said circuit being electrically connected to a circuit for energizing a switching element included in the supply for the light source. This switching element is shunted by a subsequent switching element which is coupled to the first changeover switch.

An advantage of this switching device is that, in the first place, the contrast ratio of a photographic negative can be determined with the photosensitive element in a simple manner. This is effected by measuring both the brightest section and the darkest section of the projected negative. The information thus obtained provides a ratio number which permits the selection of the correct grade photographic paper and is also a measure of the light level for determining the exposure time. The two pieces of information can be found and utilized with the device according to the invention in a very simple manner so that a person making the photographic enlargements can, inter alia, readily determine the grade of paper to be used. Subsequently it is only necessary to operate a switch and the correct exposure for the photographic negative is automatically provided.

The present invention is based upon the idea that the two pieces of information have to be converted into values of two variable electrical circuit elements, one of which is first included in the measuring circuit of the photosensitive element and is then switched over into a circuit which determines the exposure time of the light source.

The second circuit element is connected, for example, during the preparative procedure, in series with the capacitor so that the voltage set up across the capacitor can be a measure of one of the two above-mentioned pieces of information. The other pieces of information is introduced in the first electrical circuit element, through which the capacitor can discharge at a later instant. The discharge period of this capacitor is then a measure of the period during which the light source is energized.

The variable circuit elements could comprise, for example, variable choke coils.

A switching device according to the invention is preferably so designed that the photosensitive element is included in a bridge circuit and the two variable circuit elements consist of variable resistors.

An advantage of this embodiment is that the circuit elements can be cheap.

In another preferred embodiment the first variable circuit element of the switching device is connected to an operating knob which is at least partially surrounded by a graduated scale.

An advantage of this solution is that the first circuit element can be adjusted to another value in a simple manner, this value being read on the graduated scale.

In another advantageous embodiment of the invention the second variable circuit element of the switching device is a potentiometer, this potentiometer as a whole being rotatable by means of a (second) operating knob which is at least partially surrounded by a (second) graduated scale, the variable tapping on the potentiometer being displaceable by means of a (third) operating knob, the longitudinal spindles of the second and third operating knobs practically being coincident and the second operating knob being provided with a third graduated scale.

This preferred arrangement affords the advantage that the brightness of the brightest section on the photographic plate and of the darkest section can be adjusted on the second and the third operating knobs, respectively. In this case the scale provided on the second operating knob indicates directly what grade of paper is most desirable for the relevant photographic print. In addition to finding the correct paper grade, steps may at the same time be taken for adjusting the suitable exposure time.

A very good embodiment of this final preferred solution is obtained if the second operating knob is broader than the third operating knob, the third graduation being provided on a portion of the second operating knob which is transverse to the longitudinal axis of this knob.

An advantage of this solution is that the third graduated scale can be read more easily.

In yet another advantageous embodiment of the switching device according to the invention the first scale is linear and the second scale is a logarithmic scale, the third scale being divided into small compartments.

An advantage of this solution is that, due to the logarithmic scale, the brightness ratio and hence the paper grade can be determined directly, i.e., without any correction factors having to be taken into account.

In order that the invention may be readily carried into effect it will now be described in detail, by way of example, with reference to the accompanying diagrammatic drawings, in which.

Figures 1, 2:
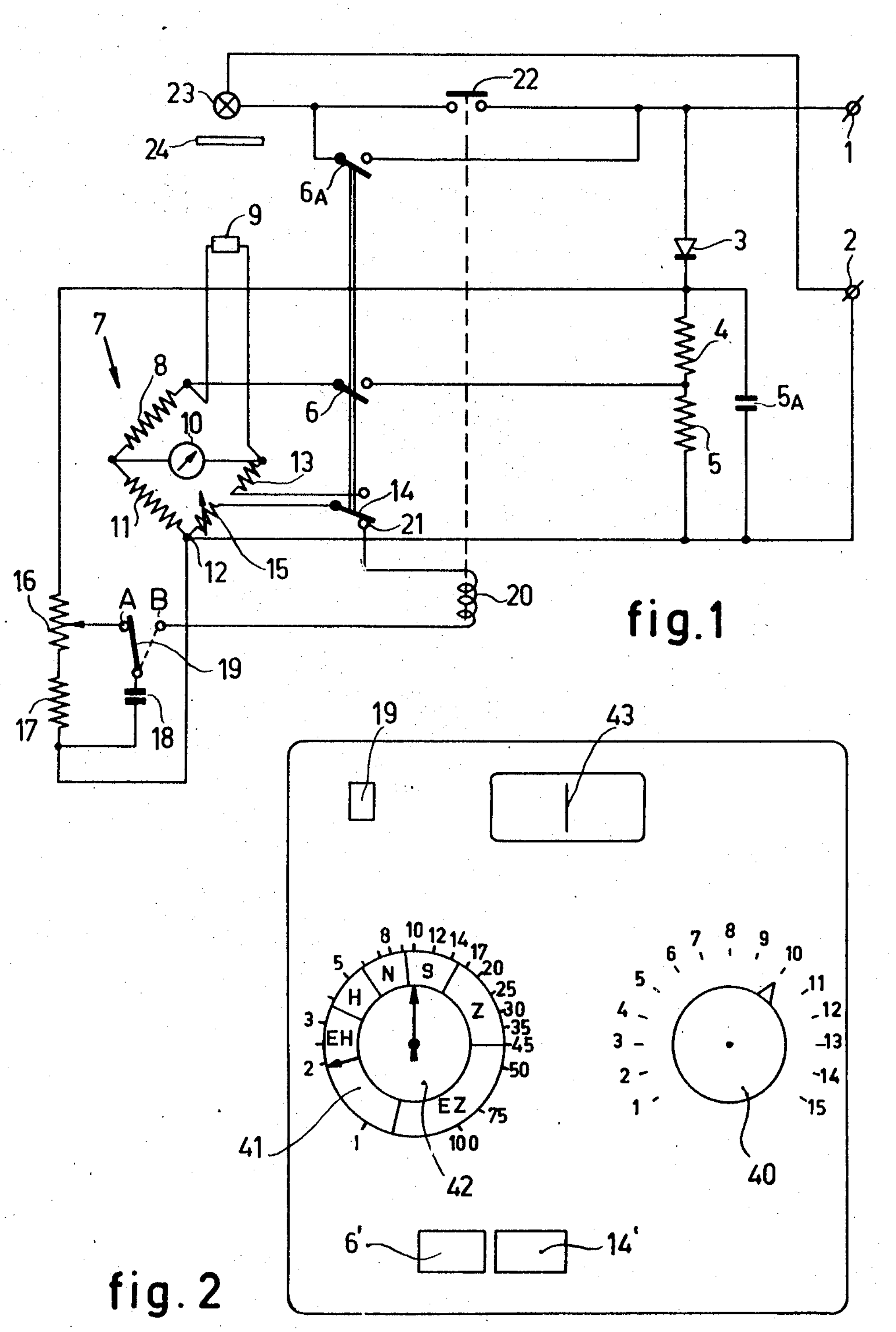
FIG. 1 is an electrical diagram of a switching device according to the invention with the associated light source of a photographic enlarger.
FIG. 2 is a plan view of a control unit which contains the circuit elements of FIG. 1.

A pair of connecting terminals indicated by the reference numerals 1 and 2 in FIG. 1 are provided to connect the circuit arrangement of FIG. 1 to an AC-current supply of 220 volts, 50 c/s. The terminal 1 is connected to the terminal 2 through a series circuit comprising a diode 3 and resistors 4 and 5. The resistors 4 and 5 are shunted by a filter capacitor 5A. The common point of the resistors 4 and 5 is connected to a bridge circuit 7 through a switch 6. The switch is connected at one end to a fixed resistor 8 of the bridge 7 and to a photoconductive resistor 9 thereof. The other ends of resistor 8 and photoconductive resistor 9 are connected together through a measuring device 10. The common point of resistor 8 and measuring device 10 is connected through a fixed resistor 11 to a feed point 12 of the bridge 7. The common point of the photoconductive resistor 9 and the measuring device 10 is connected to the feedpoint 12 of bridge 7 through a fixed resistor 13, a switch 14 and, finally, a variable resistor 15. The point 12 is connected to the junction of resistor 5 and the terminal 2. The switches 6 and 14 and a switch 6A connected in the supply line of a light source 23, to be described hereinafter, are mechanically coupled together. The common point of diode 3 and resistor 4 is connected through resistors 16 and 17 to the feedpoint 12. The resistor 17, together with part of resistor 16, is shunted by an electrical connection including a capacitor 18 and a second changeover switch 19. The tap on resistor 16 is variable. A connection of changeover switch 19 is connected through a relay 20 to a contact 21 of switch 14. A contact 22 of relay 20 lies in a series circuit between terminals 1 and 2 which includes a light source 23 of a photographic enlarger. The switch 6a shunts the relay contacts 22. A photographic negative 24 is indicated as lying between the light source 23 and the photoconductive resistor 9. The operation of this circuit will be described after the description of FIGS. 2 and 3.

FIG. 2 shows a photographic enlarger control unit having three knobs 40, 41 and 42 by means of which the variable resistors 15 and 16 are operated. The reference numeral 43 indicates the pointer of the measuring device 10 of FIG. 1. Push buttons for operating the switches 6 and 14 of FIG. 1 are indicated by the reference numerals 6′ and 14′. The reference numeral 19 indicates the switch which bears the same reference numeral in FIG. 1. The knob 40 is able to rotate about a linear scale and the knob 41 is able to rotate about a logarithmic scale. The knob 41 itself carries a scale subdivided into unequal sections.

Figure 3:
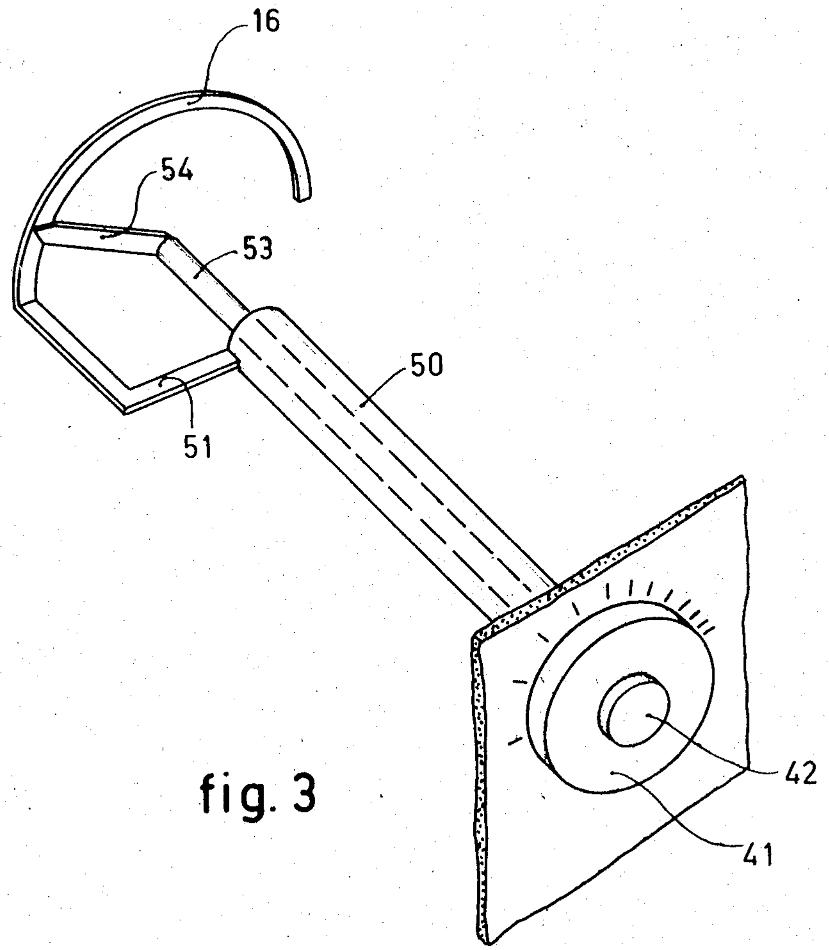
FIG. 3 is a diagrammatic perspective view of a detail of one of the elements of the control unit of FIG. 2.

FIG. 3 shows the operating mechanism for the potentiometer 16, the references 41 and 42 again indicating the knobs as in FIG. 2. The knob 41 is connected to a hollow cylinder 50 which carries at its lower end a rectangularly bent strip 51 which supports the resistor 16, which is in the form of a semicircular strip. The knob 42 supports a spindle 53 which is engaged by a displaceable tapping 54 of resistor 16.

The device described operates as follows: The switches 6A and 6 are closed and hence the switch 14 is placed in the so-called A-position. The switch 19 is also set to the A-position (cf. FIG. 1). The light source 23 is now energized as is the bridge 7 which is now ready for measuring. The brightest section of a negative 24 exposed by the light source 23 is now measured with the photoconductive resistor 9 in the bridge 7. This is effected by rotating the knob 40 (variation of resistor 15) until the measuring device 10 indicates zero. Let it be assumed that this provides the number 2 on the scale around the knob 40. After the first measurement has been carried out, the measured value (2) is transferred manually on to the knob 41 (this is a zero adjustment of the potentiometer 16). Subsequently the darkest section of the relevant negative is measured with the photoconductive resistor 9. This is again effected by rotating the knob 40 (hence again variation of resistor 15) until the measuring device 10 again indicates zero. Let it be assumed that this provides the number 10 on the scale around the knob 40. Now the knob 42 is so rotated that an arrow provided on it indicates the value 10. This results in a determined value for resistor 16 which in turn determines the voltage across the capacitor 18 (cf. FIG. 1). Knob 41 (cf. FIG. 2) is provided with a scale divided into unequal sections. These carry legends with an indication of paper grade ranging from EH (i.e., Extra Hard) to ES (Extra Soft). In the case given above the arrow of knob 42 points to the section S (cf. FIG. 2). This means that in the present case Special paper must be used. Subsequently the switches 6A and 6 are opened and hence the switch 14 is set to the B-position. Consequently the light source 23 extinguishes. Next, a sheet of the aforementioned special paper is laid in the photographic enlarger. The final operation now to be performed consists in operating the switch 19 so that it comes into the B-position. As a result, capacitor 18 discharges (cf. FIG. 1) so that the relay 20 is energized, which causes the contact 22 to close. So then the light-source 23 is switched-on. The contact 22 opens again after capacitor 18 has discharged sufficiently. The exposure time in the case described above is approximately 11 seconds. This correct value is obtained, as described, by utilizing the information set into the resistors 15 and 16, the latter of which determines the initial voltage of capacitor 18. The choice of the electrical circuit elements depends on the sensitivity of the photographic paper and on the characteristic of the photoconductive resistor.

I claim

1. An exposure control device for feeding, at least in part automatically, an exposure light source of a photographic enlarger, said device comprising a photosensitive element included in a measuring circuit and arranged to receive light from the light source, an electric supply source, two variable electrical circuit elements one of which is connected to a first changeover switch in a manner such that in one position of the switch the first circuit element forms part of the measuring circuit, a capacitor, means connecting said capacitor through a second changeover switch to said supply source and to the second variable circuit element in one position of the second changeover switch, means further connecting said first and second switches in circuit with the capacitor and first variable circuit element so that the capacitor forms a closed circuit with the first variable circuit element in the other positions of the two changeover switches, means electrically connecting said closed circuit to a circuit for energizing a first switching element included in the electric supply for the light source, a second switching element connected in shunt with said first switching element and coupled to the first changeover switch.

2. A device as claimed in claim 1, characterized in that the photosensitive element is included in one arm of a bridge circuit and the two variable circuit elements comprise variable resistors, and means connecting said one variable resistor in a second arm of the bridge circuit via the first changeover switch.

3. A device as claimed in claim 1, characterized in that the first variable circuit element of the switching device is connected to an operating knob which is at least partially surrounded by a graduated scale.

4. A device as claimed in claim 3, in which the second variable circuit element comprises a potentiometer, said potentiometer as a whole being rotatable by means of a first longitudinal spindle coupled to a second operating knob which is at least partially surrounded by a second graduated scale, the variable tapping of the potentiometer being displaceable by means of a second longitudinal spindle coupled to a third operating knob, the longitudinal spindles of the second and third operating knobs being practically coincident and the second operating knob being provided with a third graduated scale.

5. A device as claimed in claim 4, in which the second operating knob is broader than the third operating knob, characterized in that the third scale is provided on a portion of the second operating knob which is transverse to the longitudinal axis of this knob.

6. A device as claimed in claim 4, characterized in that the first scale is linear, the second scale is logarithmic, and the third scale is divided into small compartments.

7. Exposure control apparatus for controlling the energization period of a light source comprising, a source of electric energy, a photosensitive element optically coupled to the light source, first and second variable impedance elements, switching means having first and second operative positions, a bridge circuit comprising first and second impedance elements in a first and second arms of the bridge, means connecting the photosensitive element in a third arm of the bridge, a capacitor, and circuit means including said switching means for connecting said first variable impedance in a fourth bridge arm and the capacitor to said energy source via said second variable impedance element in the first operating position of the switching means so that the capacitor is charged to a voltage level determined by the setting of said second variable impedance element, a switching device interconnecting the light source with the energy source, a timing circuit including means for discharging the capacitor via the first variable impedance element and the switching means in the second operative position thereof, said timing circuit including means responsive to the capacitor discharge current for controlling the operation of the switching device whereby the energization period of the light source is determined by said capacitor voltage level and the setting of the first variable impedance element.

8. Control apparatus as claimed in claim 7 wherein said switching means comprises second and third individually operable switching devices arranged in circuit so that the second switching device alternatively connects the first variable impedance element in the fourth arm of the bridge or the discharge circuit of the capacitor and the third switching device alternatively connects the capacitor to said energy source via the second variable impedance element or to the first variable impedance element via the second switching device.

9. Control apparatus as claimed in claim 7 wherein said switching means further includes first and second switching contacts interconnecting said energy source with the input terminals of the bridge circuit and the light source, respectively.

10. Control apparatus as claimed in claim 8 wherein said switching means further includes first and second switching contacts interconnecting said energy source with the input terminals of the bridge circuit and the light source, respectively, means connecting said second switching contact in shunt with the first switching device, and means coupling the second switching device to the first and second switching contacts so as to operate same in synchronism with one another.

11. Control apparatus as claimed in claim 8 wherein said second variable impedance element comprises a potentiometer with its resistance element coupled to a first rotatable shaft and its variable tapping coupled to a second rotatable shaft coaxially arranged within the first shaft.

* * * * *